(No Model.)
G. W. MARTIN.
WRENCH.
No. 489,822.    Patented Jan. 10, 1893.
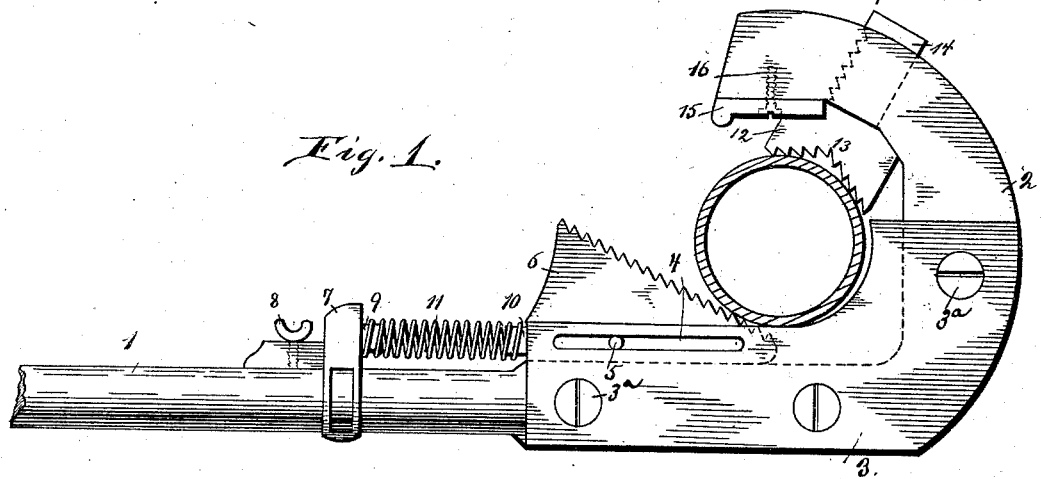
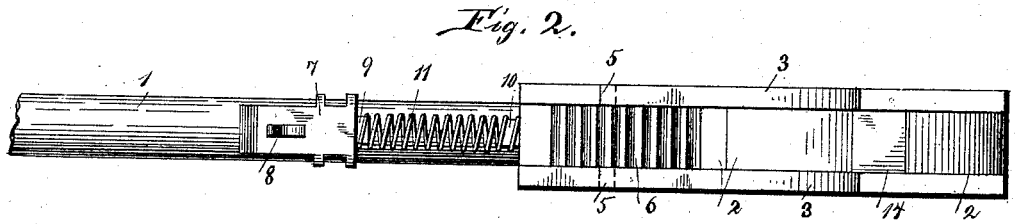
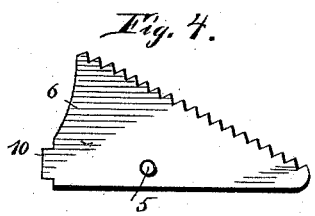
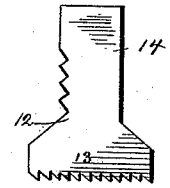
Witnesses
E. S. Julihn.
C. P. Elwell.
Inventor
George W. Martin.
By
Hopkins & Atkins.
Attorneys

UNITED STATES PATENT OFFICE.

GEORGE WASHINGTON MARTIN, OF TITUSVILLE, FLORIDA.

WRENCH.

SPECIFICATION forming part of Letters Patent No. 489,822, dated January 10, 1893.

Application filed October 13, 1892. Serial No. 448,756. (No model.)

*To all whom it may concern:*

Be it known that I, GEORGE WASHINGTON MARTIN, of Titusville, county of Brevard, and State of Florida, have invented certain new and useful Improvements in Wrenches, of which the following is a specification, reference being had to the accompanying drawings.

The object of my invention is to produce an efficient adjustable pipe and nut wrench that is, within certain limits, automatically adjustable.

Referring to the accompanying drawings, Figure 1 is a side elevation of my wrench equipped as a pipe wrench; Fig. 2 is a top plan view thereof; Fig. 3 is a view of a modified form of a permanently adjustable block, detached; and Fig. 4 a view of a modified form of sliding block, detached.

Referring to the figures on the drawings, 1 indicates the handle of my wrench, which is preferably made of round metal integrally with the hook 2.

3 indicates side plates adapted to be secured to the hook by suitable means, as for example countersunk bolts 3ª. 4 indicates opposite longitudinal slots in the side plates, within which pins 5 upon opposite sides of the friction or sliding block 6 work.

7 indicates a collar adjustable upon the handle by means of a thumb screw 8. The collar is provided with a spring seat 9; and the sliding friction block is provided with a similar seat 10.

11 indicates a spring carried on those seats, and adapted to urge the friction block toward the hooked end of the wrench, the tension of the springs being controlled by the adjustment of the collar upon the handle of the wrench.

12 indicates a permanently adjustable friction block carried in suitable bearings in the upper part of the hook, and consists preferably of a face 13 and a notched or stepped shank 14.

15 indicates a pivoted catch carried by a countersunk screw 16 upon the under side of the hook, and adapted to engage with the notches in the shank of the friction block, and to fix it in the position in which it is set.

In Figs. 3 and 4 are shown modified forms of friction blocks for adapting the wrench to be used upon nuts instead of pipe.

In use the fixed block is adjusted to a coarse adjustment, and the sliding block automatically adjusts itself precisely to the work it has to do, its spring being compressible both for the purpose of enlarging the space between the blocks, or for releasing the grip of the wrench when it is desired to remove it.

While I have shown what I consider to be a preferable embodiment of my invention, I do not desire to be understood as confining myself to the exact details of construction herein illustrated and described; but reserve to myself the right to modify them at will within the scope of my invention.

What I claim is:—

1. In a wrench, the combination with its handle and hook, an adjustable friction block having a notched shank with a bearing face, the shank mounted in bearings in the hook, of a pivoted catch adapted to engage with the notches of the shank, and the spring adjustable sliding block, substantially as and for the purposes specified.

2. In a wrench, the combination with the handle and its hook, the side plates secured thereto, the adjustable friction block having a notched shank with a bearing face, said shank mounted in bearings in the hook, a catch pivoted to the hook and adapted to engage with the notches of the shank, of the slotted side plates, a block sliding therein, a sliding collar, on the handle, a spring connected thereto and to the sliding block, and means for adjusting said collar, substantially as specified.

In testimony of all which I have hereunto subscribed my name.

GEORGE WASHINGTON MARTIN.

Witnesses:
HOWELL TITUS,
H. F. ATKINSON.